United States Patent
Annati et al.

(10) Patent No.: US 9,822,700 B2
(45) Date of Patent: *Nov. 21, 2017

(54) TURBOCHARGER WITH OIL CONTAINMENT ARRANGEMENT

(71) Applicant: Caterpillar Inc., Peoria, IL (US)

(72) Inventors: Richard E. Annati, Lafayette, IN (US); David Harnadek, Waterford, MI (US)

(73) Assignee: Caterpillar Inc., Peoria, IL (US)

(*) Notice: Subject to any disclaimer, the term of this patent is extended or adjusted under 35 U.S.C. 154(b) by 198 days.

This patent is subject to a terminal disclaimer.

(21) Appl. No.: 14/642,059

(22) Filed: Mar. 9, 2015

(65) Prior Publication Data

US 2016/0265426 A1 Sep. 15, 2016

(51) Int. Cl.

| | |
|---|---|
| *F02B 33/44* | (2006.01) |
| *F02B 39/14* | (2006.01) |
| *F01D 25/18* | (2006.01) |
| *F01D 5/02* | (2006.01) |
| *F01D 25/00* | (2006.01) |
| *F01D 25/16* | (2006.01) |
| *F04D 25/02* | (2006.01) |
| *F04D 29/059* | (2006.01) |
| *F04D 29/10* | (2006.01) |
| *F04D 29/26* | (2006.01) |
| *F04D 29/62* | (2006.01) |

(Continued)

(52) U.S. Cl.
CPC .............. *F02B 39/14* (2013.01); *F01D 5/025* (2013.01); *F01D 25/005* (2013.01); *F01D 25/16* (2013.01); *F01D 25/183* (2013.01); *F04D 25/024* (2013.01); *F04D 29/059* (2013.01); *F04D 29/102* (2013.01); *F04D 29/266* (2013.01); *F04D 29/624* (2013.01); *F02B 37/00* (2013.01); *F02M 35/10157* (2013.01); *F05D 2220/40* (2013.01); *F05D 2240/54* (2013.01); *F05D 2260/80* (2013.01); *Y02T 10/144* (2013.01)

(58) Field of Classification Search
CPC ..... F01D 25/16–25/162; F01D 25/18–25/186; F01D 25/125; F04D 29/056; F04D 29/059
USPC ........................................................ 60/605.3
See application file for complete search history.

(56) References Cited

U.S. PATENT DOCUMENTS

| | | |
|---|---|---|
| 2,082,379 A | 6/1937 | Brittain, Jr. |
| 2,630,963 A | 3/1953 | Schlichtig |
| (Continued) | | |

FOREIGN PATENT DOCUMENTS

| | | |
|---|---|---|
| DE | 10022052 A1 | 3/2001 |
| DE | 102008058507 A1 | 5/2010 |
| (Continued) | | |

*Primary Examiner* — Ngoc T Nguyen

(57) ABSTRACT

A turbocharger is provided including a turbine, a compressor and a bearing housing. A shaft is rotatably disposed within the bearing housing and extends into the turbine and the compressor. A bearing arrangement is disposed between the shaft and the bearing. The bearing arrangement includes a roller bearing formed between an outer bearing race element disposed in the bearing bore, and an inner bearing race element disposed in the outer bearing race element. A bearing retainer connected between the bearing housing and the compressor. An end portion of the bearing inner race element includes an integral oil slinger comprising a radially outward extending portion that slopes away from the shaft.

14 Claims, 7 Drawing Sheets

(51) Int. Cl.
*F02B 37/00* (2006.01)
*F02M 35/10* (2006.01)

(56) References Cited

U.S. PATENT DOCUMENTS

| | | |
|---|---|---|
| 2,717,732 A | 9/1955 | Dailey, Jr. |
| 2,935,294 A | 5/1960 | Angell et al. |
| 3,039,007 A | 6/1962 | Williams et al. |
| 3,133,693 A | 5/1964 | Holl |
| 3,390,926 A | 7/1968 | Woollenweber, Jr. |
| 3,723,022 A | 3/1973 | Olson |
| 3,887,198 A | 6/1975 | McClure et al. |
| 4,329,000 A * | 5/1982 | Keske ............... F01D 25/16 384/464 |
| 4,389,052 A | 6/1983 | Shimizu et al. |
| 4,749,334 A | 6/1988 | Byrne |
| 4,769,993 A | 9/1988 | Kawamura |
| 4,948,333 A | 8/1990 | Meer et al. |
| 5,048,978 A | 9/1991 | Singh |
| 5,145,334 A * | 9/1992 | Gutknecht ........... F01D 25/164 417/407 |
| 5,228,756 A | 7/1993 | Krampera |
| 5,253,985 A | 10/1993 | Ruetz |
| 5,299,909 A | 4/1994 | Wulf |
| 5,443,362 A | 8/1995 | Crites et al. |
| 5,454,646 A | 10/1995 | Reisdorf |
| 5,465,482 A | 11/1995 | Elvekjaer et al. |
| 5,526,640 A | 6/1996 | Brooks et al. |
| 5,775,819 A | 7/1998 | Kinney et al. |
| 5,890,881 A * | 4/1999 | Adeff ............... F01D 25/186 417/407 |
| 5,964,574 A | 10/1999 | Meier et al. |
| 6,045,266 A | 4/2000 | Mitsubori et al. |
| 6,120,246 A | 9/2000 | Auger et al. |
| 6,161,768 A | 12/2000 | Gordon et al. |
| 6,168,375 B1 | 1/2001 | LaRue et al. |
| 6,220,234 B1 | 4/2001 | Baker et al. |
| 6,224,332 B1 | 5/2001 | Leach et al. |
| 6,264,429 B1 | 7/2001 | Koeller et al. |
| 6,368,077 B1 | 4/2002 | Meyerkord et al. |
| 6,371,238 B1 | 4/2002 | Svihla |
| 6,478,553 B1 | 11/2002 | Panos et al. |
| 6,481,917 B1 | 11/2002 | Chen et al. |
| 6,499,884 B1 | 12/2002 | Svihla et al. |
| 6,530,744 B2 | 3/2003 | Liotta et al. |
| 6,540,480 B2 | 4/2003 | Nikpour |
| 6,609,881 B2 | 8/2003 | Brown et al. |
| 6,612,747 B1 | 9/2003 | Jones |
| 6,629,556 B2 | 10/2003 | Decker et al. |
| 6,663,347 B2 | 12/2003 | Decker et al. |
| 6,669,372 B1 | 12/2003 | Martin |
| 6,709,232 B1 | 3/2004 | Vogiatzis |
| 6,733,236 B2 | 5/2004 | Sumser et al. |
| 6,742,989 B2 | 6/2004 | Osako et al. |
| 6,754,954 B1 | 6/2004 | Decker |
| 6,767,185 B2 | 7/2004 | Martin et al. |
| 6,874,998 B2 | 4/2005 | Roby |
| 6,877,901 B2 * | 4/2005 | Wollenweber ........ F01D 25/164 384/535 |
| 6,904,949 B2 | 6/2005 | Decker et al. |
| 6,910,863 B2 | 6/2005 | Scardicchio et al. |
| 6,928,816 B2 | 8/2005 | Leavesley |
| 6,942,460 B2 | 9/2005 | Osako et al. |
| 6,968,702 B2 | 11/2005 | Child et al. |
| 6,979,172 B1 | 12/2005 | Mackenzie |
| 6,979,183 B2 | 12/2005 | Baumann |
| 6,994,526 B2 | 2/2006 | Furman et al. |
| 7,001,143 B2 | 2/2006 | Vogiatzis |
| 7,001,155 B2 | 2/2006 | Cabrales et al. |
| 7,008,182 B2 | 3/2006 | Kopp et al. |
| 7,010,915 B2 | 3/2006 | Stilgenbauer |
| 7,040,867 B2 | 5/2006 | Louthan et al. |
| 7,052,241 B2 | 5/2006 | Decker |
| 7,063,508 B2 | 6/2006 | Higashimori et al. |
| 7,066,919 B1 | 6/2006 | Sauerland et al. |
| 7,086,842 B2 | 8/2006 | Wild |
| 7,097,411 B2 | 8/2006 | Smoke et al. |
| 7,104,693 B2 | 9/2006 | Mavrosakis |
| 7,118,335 B2 | 10/2006 | Vacarezza et al. |
| 7,147,433 B2 | 12/2006 | Ghizawi |
| 7,204,671 B2 | 4/2007 | Dellmann |
| 7,214,037 B2 | 5/2007 | Mavrosakis |
| 7,232,258 B2 | 6/2007 | Garcia |
| 7,241,416 B2 | 7/2007 | Sweetland |
| 7,260,892 B2 | 8/2007 | Schilling et al. |
| 7,329,048 B2 | 2/2008 | Klusman et al. |
| 7,344,362 B2 | 3/2008 | Kopp et al. |
| 7,384,236 B2 | 6/2008 | Meier et al. |
| 7,401,980 B2 | 7/2008 | Krauss et al. |
| 7,419,304 B2 | 9/2008 | Mavrosakis |
| 7,428,814 B2 | 9/2008 | Pedersen et al. |
| 7,461,507 B2 | 12/2008 | Arnold et al. |
| 7,461,979 B2 | 12/2008 | Mavrosakis |
| 7,478,532 B2 | 1/2009 | Martin et al. |
| 7,484,932 B2 | 2/2009 | Aguilar |
| 7,517,154 B2 | 4/2009 | McKeirnan, Jr. |
| 7,568,883 B2 | 8/2009 | Arnold et al. |
| 7,600,969 B2 | 10/2009 | Frankenstein et al. |
| 7,631,497 B2 | 12/2009 | Panek |
| 7,677,041 B2 * | 3/2010 | Woollenweber ........ F01D 25/16 60/608 |
| 7,686,586 B2 | 3/2010 | Nikpour |
| 7,722,336 B2 | 5/2010 | Vaccarezza et al. |
| 7,766,550 B2 | 8/2010 | Larue |
| 7,771,162 B2 | 8/2010 | Castan |
| 7,771,170 B2 | 8/2010 | Seiler |
| 7,793,494 B2 | 9/2010 | Wirth et al. |
| 7,797,936 B2 | 9/2010 | Hayashi et al. |
| 7,798,770 B2 | 9/2010 | Sumser et al. |
| 7,837,448 B2 | 11/2010 | Shimizu et al. |
| 7,845,900 B2 | 12/2010 | Roduner et al. |
| 7,874,136 B2 | 1/2011 | Heyerman |
| 7,878,758 B2 | 2/2011 | Allen et al. |
| 7,918,215 B2 | 4/2011 | Martin et al. |
| 7,946,809 B2 | 5/2011 | Meier et al. |
| 7,987,599 B2 | 8/2011 | Mavrosakis |
| 8,011,885 B2 | 9/2011 | Purdey |
| 8,016,554 B2 | 9/2011 | Ward |
| 8,087,088 B1 | 12/2011 | Pennington et al. |
| 8,118,570 B2 | 2/2012 | Meacham et al. |
| 8,157,516 B2 | 4/2012 | Chen et al. |
| 8,157,543 B2 | 4/2012 | Shimizu |
| 8,162,602 B2 | 4/2012 | Caucheteux et al. |
| 8,162,604 B2 | 4/2012 | Kühnel et al. |
| 8,166,746 B2 | 5/2012 | Heyerman |
| 8,181,632 B2 | 5/2012 | Ueno et al. |
| 8,186,886 B2 | 5/2012 | Mckeirnan, Jr. |
| 8,226,296 B2 | 7/2012 | Larue |
| 8,234,867 B2 | 8/2012 | Palazzolo et al. |
| 8,240,921 B2 | 8/2012 | Böning et al. |
| 8,241,006 B2 | 8/2012 | Renett |
| 8,328,509 B2 | 12/2012 | Gee et al. |
| 8,328,535 B2 | 12/2012 | Anschel et al. |
| 8,339,122 B2 | 12/2012 | Cox et al. |
| 8,348,595 B2 | 1/2013 | Koch et al. |
| 8,353,666 B2 | 1/2013 | Masson et al. |
| 8,360,730 B2 | 1/2013 | Chen et al. |
| 8,372,335 B2 | 2/2013 | Claude et al. |
| 8,376,721 B2 | 2/2013 | Thayer et al. |
| 8,398,363 B2 | 3/2013 | Mundinger et al. |
| 8,419,350 B2 | 4/2013 | Just |
| 8,449,190 B2 | 5/2013 | Larue |
| 8,454,242 B2 | 6/2013 | Mavrosakis |
| 8,464,528 B2 | 6/2013 | Sausse et al. |
| 8,464,777 B2 | 6/2013 | Zhu et al. |
| 8,465,261 B2 | 6/2013 | Holzschuh |
| 8,496,452 B2 | 7/2013 | Marsal et al. |
| 8,517,665 B2 | 8/2013 | Lugo et al. |
| 8,517,679 B2 | 8/2013 | Schlienger et al. |
| 8,545,172 B2 | 10/2013 | Severin et al. |
| 8,568,092 B2 | 10/2013 | Matsuyama |
| 8,572,963 B2 | 11/2013 | Cuniberti et al. |
| 8,602,655 B2 | 12/2013 | Tabata |
| 8,621,863 B2 | 1/2014 | Krätschmer et al. |

(56) References Cited

U.S. PATENT DOCUMENTS

| | | |
|---|---|---|
| 8,622,691 B2 | 1/2014 | Eguchi et al. |
| 8,628,247 B2 | 1/2014 | Uesugi |
| 8,636,413 B2 | 1/2014 | Fiedler et al. |
| 8,641,380 B2 | 2/2014 | McKenzie |
| 8,641,382 B2 | 2/2014 | Weber et al. |
| 8,668,432 B2 | 3/2014 | Sebald et al. |
| 8,696,316 B2 | 4/2014 | Decker et al. |
| 8,702,394 B2 | 4/2014 | Decker et al. |
| 8,727,716 B2 | 5/2014 | Clements et al. |
| 8,734,130 B2 | 5/2014 | Meacham et al. |
| 8,736,393 B2 | 5/2014 | Herault et al. |
| 8,740,465 B2 | 6/2014 | McKeirnan, Jr. |
| 8,763,393 B2 | 7/2014 | Severin et al. |
| 8,764,296 B2 | 7/2014 | Omori |
| 8,764,376 B2 | 7/2014 | Lei et al. |
| 8,764,388 B2 | 7/2014 | Roberts et al. |
| 8,790,066 B2 | 7/2014 | Gutknecht |
| 8,790,574 B2 | 7/2014 | Toda et al. |
| 8,794,905 B2 | 8/2014 | Matsuyama |
| 8,807,840 B2 | 8/2014 | House et al. |
| 8,814,538 B2 | 8/2014 | House et al. |
| 8,827,638 B2 | 9/2014 | Delitz |
| 8,834,111 B2 | 9/2014 | Holzschuh |
| 8,845,271 B2 | 9/2014 | Woollenweber et al. |
| 8,961,128 B2 | 2/2015 | Mavrosakis et al. |
| 9,212,700 B1 * | 12/2015 | Bucking ............... F01D 25/16 |
| 9,464,637 B2 * | 10/2016 | Nguyen-Schaefer ... F01D 25/16 |
| 2008/0267548 A1 * | 10/2008 | Chriss .................. F01D 25/16 |
| | | 384/492 |
| 2011/0052388 A1 * | 3/2011 | Mavrosakis .......... F01D 25/162 |
| | | 415/229 |
| 2012/0023931 A1 * | 2/2012 | House .................... F01D 25/16 |
| | | 60/598 |
| 2012/0321491 A1 * | 12/2012 | Viault .................. F01D 25/183 |
| | | 417/406 |
| 2012/0328418 A1 | 12/2012 | Yang et al. |
| 2013/0000998 A1 | 1/2013 | Trower et al. |
| 2013/0084035 A1 | 4/2013 | Williams et al. |
| 2013/0180242 A1 | 7/2013 | Lancaster |
| 2013/0202432 A1 | 8/2013 | House et al. |
| 2013/0302159 A1 | 11/2013 | Grussmann et al. |
| 2013/0309072 A1 | 11/2013 | Marsal et al. |
| 2014/0053573 A1 | 2/2014 | Josefczyk et al. |
| 2014/0086731 A1 | 3/2014 | Schmidt et al. |
| 2014/0186095 A1 | 7/2014 | Peters et al. |
| 2014/0255157 A1 * | 9/2014 | Meacham ............. F01D 25/164 |
| | | 60/605.3 |
| 2014/0358363 A1 | 12/2014 | Mavrosakis et al. |
| 2015/0233382 A1 * | 8/2015 | Nguyen-Schaefer . F04D 29/059 |
| | | 415/116 |

FOREIGN PATENT DOCUMENTS

| | | |
|---|---|---|
| DE | 102010064047 A1 | 6/2012 |
| EP | 1357278 A2 | 10/2003 |
| EP | 2420660 A1 | 2/2012 |
| GB | 617763 A | 2/1949 |
| GB | 847242 A | 9/1960 |
| GB | 898164 A | 6/1962 |
| JP | 06-012798 U | 2/1994 |
| JP | 08-254106 A | 10/1996 |
| WO | WO 82/0865 A1 | 3/1982 |
| WO | WO 2013/023930 A1 | 2/2013 |
| WO | WO 2014/109849 A1 | 7/2014 |
| WO | WO 2014/165138 A1 | 10/2014 |

* cited by examiner

TURBOCHARGER WITH OIL CONTAINMENT ARRANGEMENT

TECHNICAL FIELD

This patent disclosure relates generally to turbochargers and, more particularly, to turbochargers used on internal combustion engines.

BACKGROUND

Internal combustion engines are supplied with a mixture of air and fuel for combustion within the engine that generates mechanical power. To maximize the power generated by this combustion process, the engine is often equipped with a turbocharged air induction system. A turbocharged air induction system includes a turbocharger that uses exhaust from the engine to compress air flowing into the engine, thereby forcing more air into a combustion chamber of the engine than the engine could otherwise draw into the combustion chamber. This increased supply of air allows for increased fueling, resulting in an increased engine power output.

A turbocharger generally comprises a compressor wheel mounted on one end of a single shaft in a compressor housing and a turbine wheel mounted on the other end of the shaft in a turbine housing. Typically, the turbine housing is formed separately from the compressor housing. A bearing housing is connected between the turbine and compressor housings for containing bearings for the shaft. The turbine housing receives exhaust gas from the engine and directs it to the turbine wheel which is driven by the exhaust gas. The turbine assembly thus extracts power from the exhaust gas and drives the compressor.

In conventional turbochargers, engine oil is provided to lubricate and cool bearings in the bearing housing that rotatably support the turbocharger shaft that transfers power from the turbine to the compressor. The oil used in the bearing housing should be prevented from leaking into the operating cavities of the turbine and compressor both during engine operation and also after engine shutdown.

SUMMARY

In one aspect, the disclosure describes a turbocharger including a turbine that includes a turbine wheel and a compressor that includes a compressor wheel. A bearing housing is disposed and connected between the turbine and the compressor, the bearing housing forming a bearing bore therethrough. A shaft is rotatably disposed within the bearing housing and extends into the turbine and the compressor. The turbine wheel is connected to one end of the shaft and the compressor wheel is connected to an opposite end of the shaft such that the turbine wheel is rotatably disposed in the turbine and the compressor wheel is rotatably disposed in the compressor. A bearing arrangement is disposed between the shaft and the bearing housing. The bearing arrangement including a roller bearing formed between an outer bearing race element disposed in the bearing bore, and an inner bearing race element disposed in the outer bearing race element. The bearing retainer forms an inner bore through which the shaft extends. The inner bearing race element is arranged to rotate with the shaft. An end portion of the bearing inner race element includes an integral oil slinger comprising a radially outward extending portion that slopes away from the shaft.

In another aspect, the disclosure describes a turbocharger including a turbine that includes a turbine housing surrounding a turbine wheel and a compressor that includes a compressor housing that surrounds a compressor wheel. A bearing housing is disposed and connected between the turbine and the compressor. The bearing housing forms a bearing bore therethrough that accommodates a shaft interconnecting the turbine wheel and the compressor wheel to transfer power therebetween. The shaft is rotatably mounted within the bearing housing and extends into the turbine and the compressor such that the turbine wheel is connected to one end of the shaft and the compressor wheel is connected to an opposite end of the shaft. A bearing arrangement is disposed between the shaft and the bearing housing. The bearing arrangement includes first and second bearings, each of the first and second bearings formed by a respective first and second plurality of roller elements engaged between a respective first and second inner race and a respective first and second outer race. An outer bearing race element is disposed within the bearing bore and forms the respective first and second outer races. An inner bearing race element is disposed within the outer bearing race element and between the outer bearing race element and the shaft. The inner bearing race element forms the respective first and second inner races such that the respective first inner race is axially aligned with the respective first outer race, and the respective second inner race is axially aligned with the respective second outer race. The inner bearing race element is arranged to rotate with the shaft. An end portion of the bearing inner race element includes an integral oil slinger comprising a radially outward extending portion that slopes away from the shaft.

In yet another aspect the disclosure describes an internal combustion engine having a plurality of combustion chambers formed in a cylinder block, an intake manifold disposed to provide air or a mixture of air with exhaust gas to the combustion chambers, and an exhaust manifold disposed to receive exhaust gas from the combustion chambers. The engine further includes a turbine that includes a turbine housing surrounding a turbine wheel. The turbine housing is fluidly connected to the exhaust manifold and disposed to receive exhaust gas therefrom to drive the turbine wheel. A compressor includes a compressor housing that surrounds a compressor wheel. The compressor housing is fluidly connected to the intake manifold and disposed to provide air thereto. A bearing housing is disposed and connected between the turbine and the compressor, the bearing housing forming a bearing bore therethrough. A shaft is rotatably disposed within the bearing housing and extends into the turbine and the compressor. The turbine wheel is connected to one end of the shaft and the compressor wheel is connected to an opposite end of the shaft such that the turbine wheel is rotatably disposed in the turbine and the compressor wheel is rotatably disposed in the compressor. A bearing arrangement is disposed between the shaft and the bearing housing. The bearing arrangement including a roller bearing formed between an outer bearing race element disposed in the bearing bore, and an inner bearing race element disposed in the outer bearing race element. The inner bearing race element is arranged to rotate with the shaft. An end portion of the bearing inner race element includes an integral oil slinger comprising a radially outward extending portion that slopes away from the shaft.

DETAILED DESCRIPTION

Figure 1:
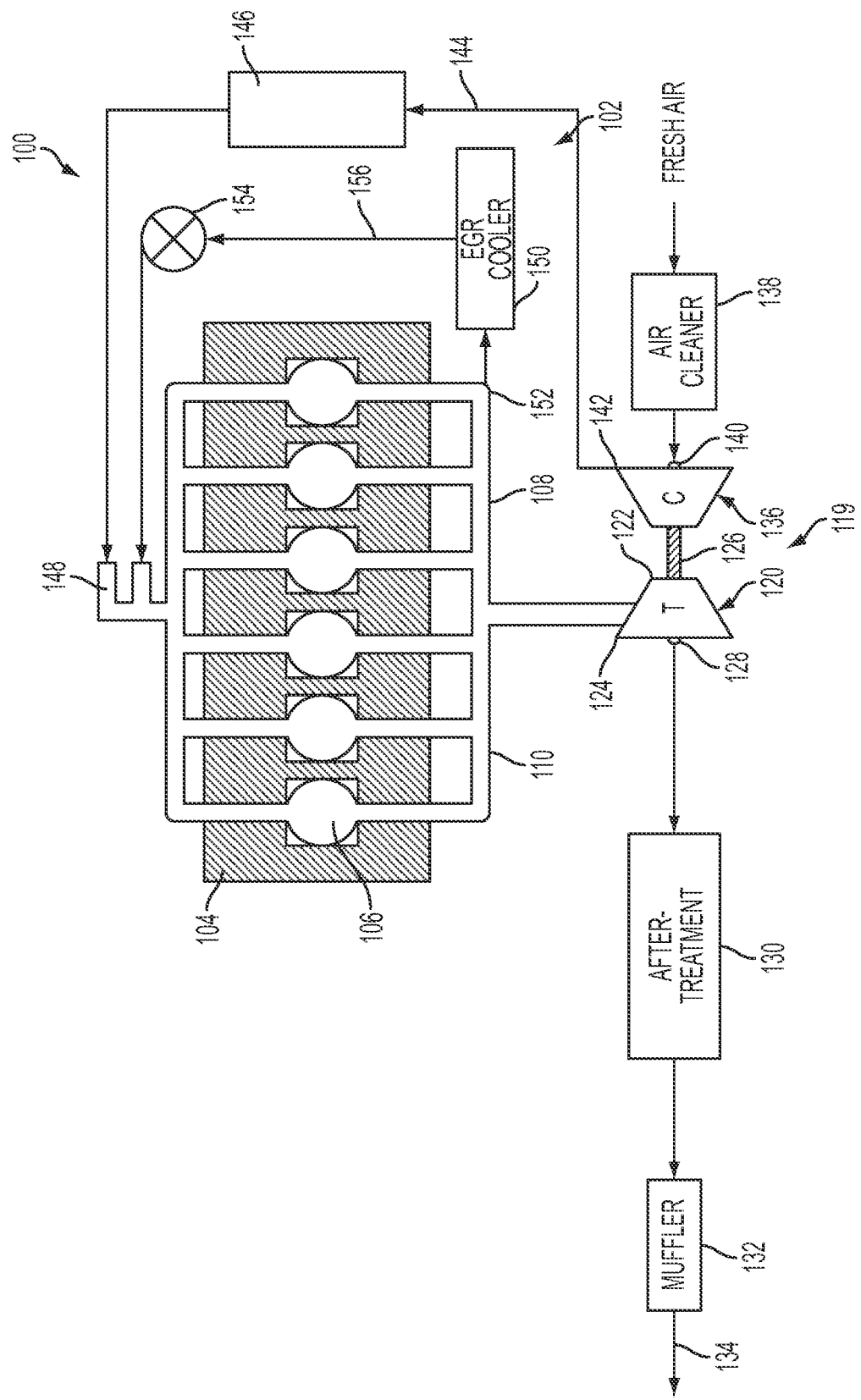
FIG. 1 is a block diagram of an internal combustion engine in accordance with the disclosure.

This disclosure relates to an improved turbocharger used in conjunction with an internal combustion engine to promote the engine's efficient operation and also the robust and reliable operation of the turbocharger. A simplified block diagram of an engine 100 is shown in FIG. 1. The engine 100 includes a cylinder case 104 that houses a plurality of combustion cylinders 106. In the illustrated embodiment, six combustion cylinders are shown in an inline or "I" configuration, but any other number of cylinders arranged in a different configuration, such as a "V" configuration, may be used. The plurality of combustion cylinders 106 is fluidly connected via exhaust valves (not shown) to first exhaust conduit 108 and the second exhaust conduit 110. Each of the first exhaust conduit 108 and the second exhaust conduit 110 is connected to a turbine 120 of a turbocharger 119. In the illustrated embodiment, the turbine 120 includes a housing 122 having a gas inlet 124, which is fluidly connected to the first exhaust conduit 108 and the second exhaust conduit 110 and arranged to receive exhaust gas therefrom. Exhaust gas provided to the turbine 120 causes a turbine wheel (not shown here) connected to a shaft 126 to rotate. Exhaust gas exits the housing 122 of the turbine 120 through an outlet 128. The exhaust gas at the outlet 128 is optionally passed through other exhaust after-treatment components and systems such as an after-treatment device 130 that mechanically and chemically removes combustion byproducts from the exhaust gas stream, and/or a muffler 132 that dampens engine noise, before being expelled to the environment through a stack or tail pipe 134.

Rotation of the shaft 126 causes a wheel (not shown here) of a compressor 136 to rotate. As shown, the compressor 136 may be a radial, mixed flow or axial compressor configured to receive a flow of fresh, filtered air from an air filter 138 through a compressor inlet 140. Pressurized air at an outlet 142 of the compressor 136 is routed via a charge air conduit 144 to a charge air cooler 146 before being provided to an intake manifold 148 of the engine 100. In the illustrated embodiment, air from the intake manifold 148 is muted to the combustion cylinders 106 where it is mixed with fuel and combusted to produce engine power.

An EGR system 102, which is optional, includes an EGR cooler 150, which is also optional, that is fluidly connected to an EGR gas supply port 152 of the first exhaust conduit 108. A flow of exhaust gas from the first exhaust conduit 108 can pass through the EGR cooler 150 where it is cooled before being supplied to an EGR valve 154 via an EGR conduit 156. The EGR valve 154 may be electronically controlled and configured to meter or control the flow rate of the gas passing through the EGR conduit 156. An outlet of the EGR valve 154 is fluidly connected to the intake manifold 148 such that exhaust gas from the EGR conduit 156 may mix with compressed air from the charge air cooler 146 within the intake manifold 148 of the engine 100.

The pressure of exhaust gas at the first exhaust conduit 108, which is commonly referred to as back pressure, is higher than ambient pressure, in part, because of the flow restriction presented by the turbine 120. For the same reason, a positive back pressure is present in the second exhaust conduit 110. The pressure of the air or the air/EGR gas mixture in the intake manifold 148, which is commonly referred to as boost pressure, is also higher than ambient because of the compression provided by the compressor 136. In large part, the pressure difference between back pressure and boost pressure, coupled with the flow restriction and flow area of the components of the EGR system 102, determine the maximum flow rate of EGR gas that may be achieved at various engine operating conditions.

Figure 2:
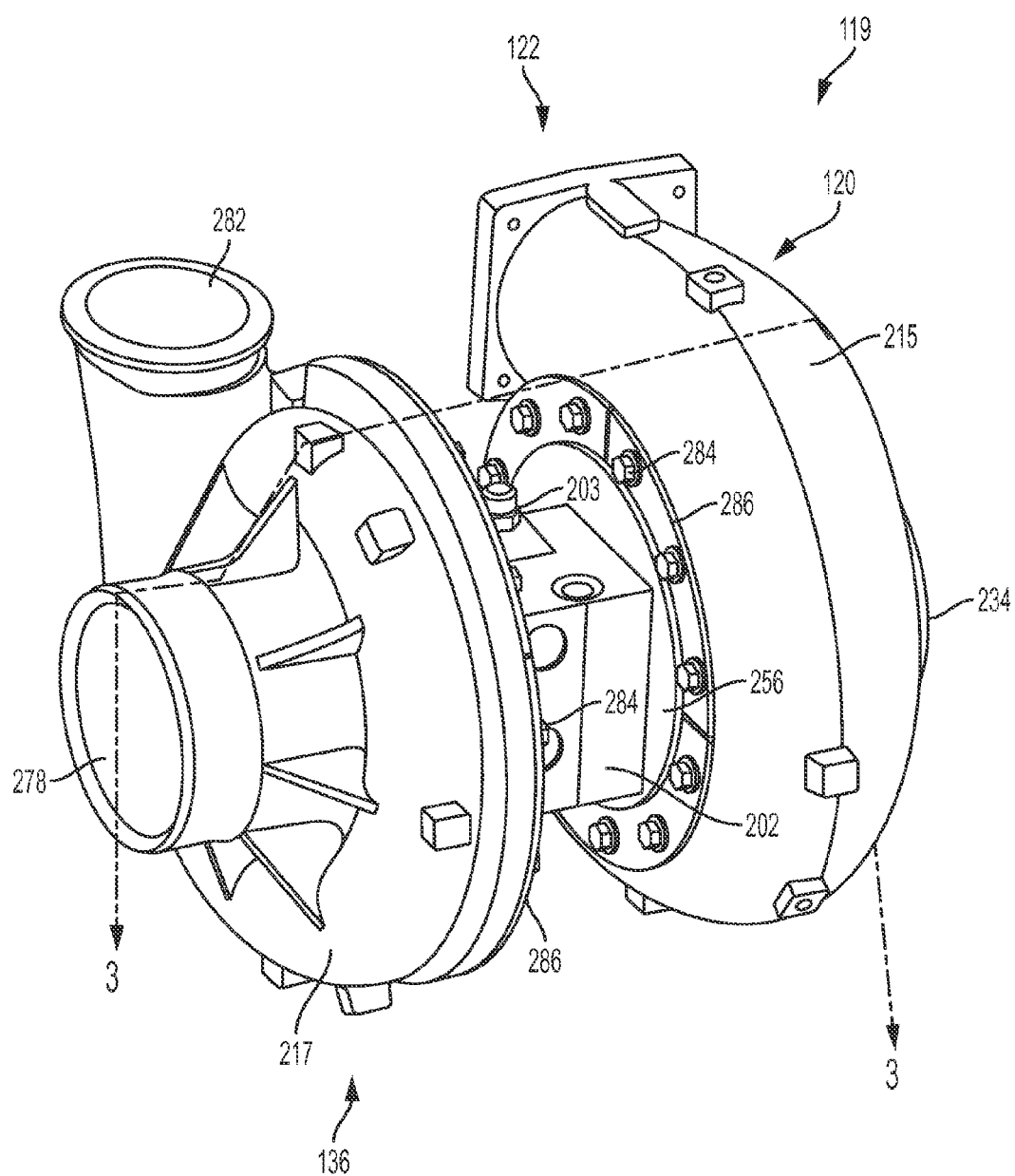
FIG. 2 is an outline view from a side perspective of a turbocharger in accordance with the disclosure.
Figure 3:
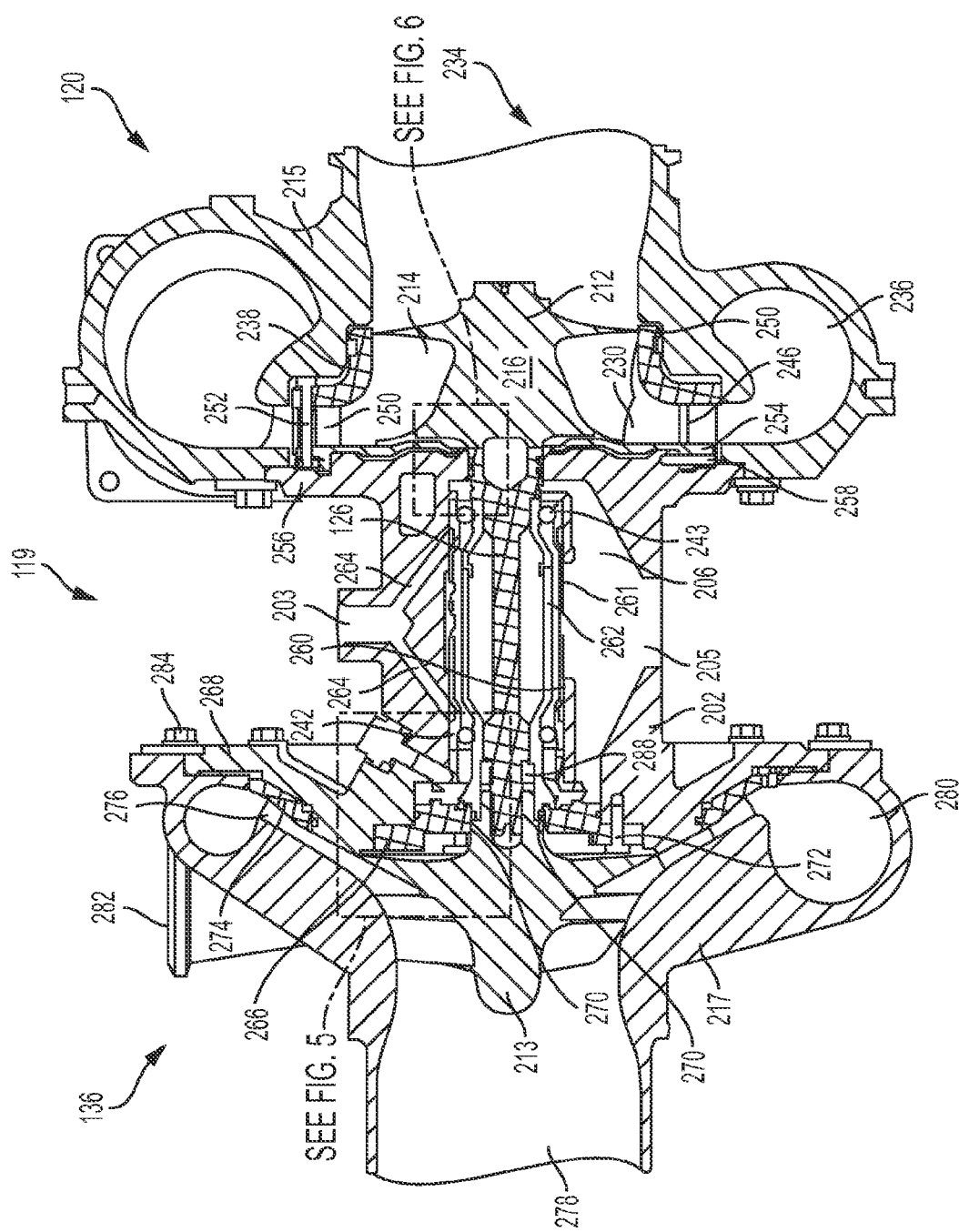
FIG. 3 is a fragmented view through a center of the turbocharger shown in FIG. 2.

An outline view of the turbocharger 119 is shown in FIG. 2, and a fragmented view is shown in FIG. 3. In reference to these figures, and in the description that follows, structures and features that are the same or similar to corresponding structures and features already described may be, at times, denoted by the same reference numerals as previously used for simplicity. As shown, the turbine 120 is connected to a bearing housing 202. The bearing housing 202 surrounds a portion of the shaft 126 and includes bearings 242 and 243 disposed within a lubrication cavity 206 formed within the bearing housing 202. The lubrication cavity 206 includes a lubricant inlet port 203 and a lubricant outlet opening 205 that accommodate a flow of lubrication fluid, for example, engine oil, therethrough to lubricate the bearings 242 and 243 as the shaft 126 rotates during engine operation.

The shaft 126 is connected to a turbine wheel 212 at one end and to a compressor wheel 213 at another end. The turbine wheel 212 is configured to rotate within a turbine housing 215 that is connected to the bearing housing 202. The compressor wheel 213 is disposed to rotate within a compressor housing 217. The turbine wheel 212 includes a plurality of blades 214 radially arranged around a hub 216. The hub 216 is connected to an end of the shaft 126. In the illustrated embodiment, the turbine wheel 212 is connected at the end of the shaft 126 by welding, but other methods, such as by use of a fastener, may be used to connect the turbine wheel to the shaft. The turbine wheel 212 is rotatably disposed between an exhaust turbine nozzle 230 defined within the turbine housing 215. The exhaust turbine nozzle 230 provides exhaust gas to the turbine wheel 212 in a generally radially inward and axial direction relative to the shaft 126 and the blades 214 such that the turbine 120 is a mixed flow turbine, meaning, exhaust gas is provided to the turbine wheel in both radial and axial directions. Exhaust gas passing over the turbine wheel 212 exits the turbine housing 215 via an outlet bore 234 that is formed in the housing. The outlet bore 234 is fluidly connected to the outlet 128 (FIG. 1). The exhaust turbine nozzle 230 is fluidly connected to an inlet gas passage 236 having a scrolled shape and formed in the turbine housing 215. The inlet gas passage 236 fluidly interconnects the exhaust turbine nozzle 230 with the gas inlet 124 (also see FIG. 1). It is noted that a single, inlet gas passage 236 is shown formed in the turbine housing 215 in FIG. 3, but in alternative embodiments separated passages may be formed in a single turbine housing.

In the embodiment shown in FIG. 3, the inlet gas passage 236 wraps around the area of the turbine wheel 212 and outlet bore 234 and is open to the exhaust turbine nozzle 230 around the entire periphery of the turbine wheel 212. A cross sectional flow area of the inlet gas passage 236 decreases along a flow path of gas entering the turbine 120 via the gas inlet 124 and being provided to the turbine wheel 212 through the exhaust turbine nozzle 230.

A radial nozzle ring 238, which also forms a shroud for the turbine wheel 212, is disposed substantially around the entire periphery of the turbine wheel 212. As will be discussed in more detail in the paragraphs that follow, the radial nozzle ring 238 is disposed in fluid communication with the inlet gas passage 236 and defines the exhaust turbine nozzle 230 around the turbine wheel 212. As shown in FIG. 3, the radial nozzle ring forms a plurality of vanes 246, which are fixed and which are symmetrically disposed around the radial nozzle ring 238 and operate to direct exhaust gas form the inlet gas passage 236 towards the turbine wheel 212. The shape and configuration of the plurality of vanes 246 can vary. Flow channels 250 having an inclined shape are defined between adjacent vanes in the first plurality of vanes 246. A flow momentum of gas passing through the flow channels 250 is directed generally tangentially and radially inward towards an inner diameter of the turbine wheel 212 such that wheel rotation may be augmented. Although the vanes 246 further have a generally curved airfoil shape to minimize flow losses of gas passing over and between the vanes, thus providing respectively uniform inflow conditions to the turbine wheel, they also provide structural support to a shroud portion of the radial nozzle ring 238. The radial nozzle ring 238, which includes the shroud portion, is connected to the turbine via a plurality of fasteners 252, but other methods can be used. The fasteners 252 engage a heat shield 254, which is connected to a turbine flange 256 formed on the bearing housing 202 with an interference fit and stakes or pins 258.

The bearing housing 202 encloses a portion of the shaft 126, which is rotationally mounted in a bearing bore 260 formed in the bearing housing by bearings 242 and 243. Each of the bearings 242 and 243 includes an outer race 261 that engages an inner diameter surface of the bearing bore 260, rollers, and an inner race 262 that has a generally tubular shape and extends around the shaft 126 along its length. Oil from the lubricant inlet port 203 is provided by an external oil pump to the bearings 242 and 243 during operation via passages 264, from where it washes over the bearings to cool and lubricate them before collecting in the lubrication cavity 206 and draining out of the bearing housing through the lubricant outlet opening 205.

The bearings 242 and 243 are axially retained within the bearing bore 260 by a bearing retainer 266 disposed between a compressor mounting plate 268 formed on the bearing housing 202 and the compressor wheel 213. The bearing retainer 266 forms a central opening 270 having an inner diameter that is smaller than an inner diameter of the bearing bore 260 such that, when the bearing retainer 266 is connected to the bearing housing 202, the bearings 242 and 243 are retained within the bearing bore 260. The bearing retainer 266 is fastened to the compressor mounting plate 268 by fasteners 272, but other fastening or retention structures may be used.

The compressor 136 includes a compressor vane ring 274 that forms vanes 276 disposed radially around the compressor wheel 213. The vanes 276 fluidly connect a compressor inlet bore 278, which contains the compressor wheel 213, with a compressor scroll passage 280 that is formed in the compressor housing 217 and that terminates to a compressor outlet opening 282. Bolts 284 and circular plate segments 286 connect the turbine housing 215 to the turbine flange 256 and the compressor housing 217 to the compressor mounting plate 268. A nut 288 engaged on the shaft 126 retains the shaft 126 within the bearings 242 and 243.

Figure 4:
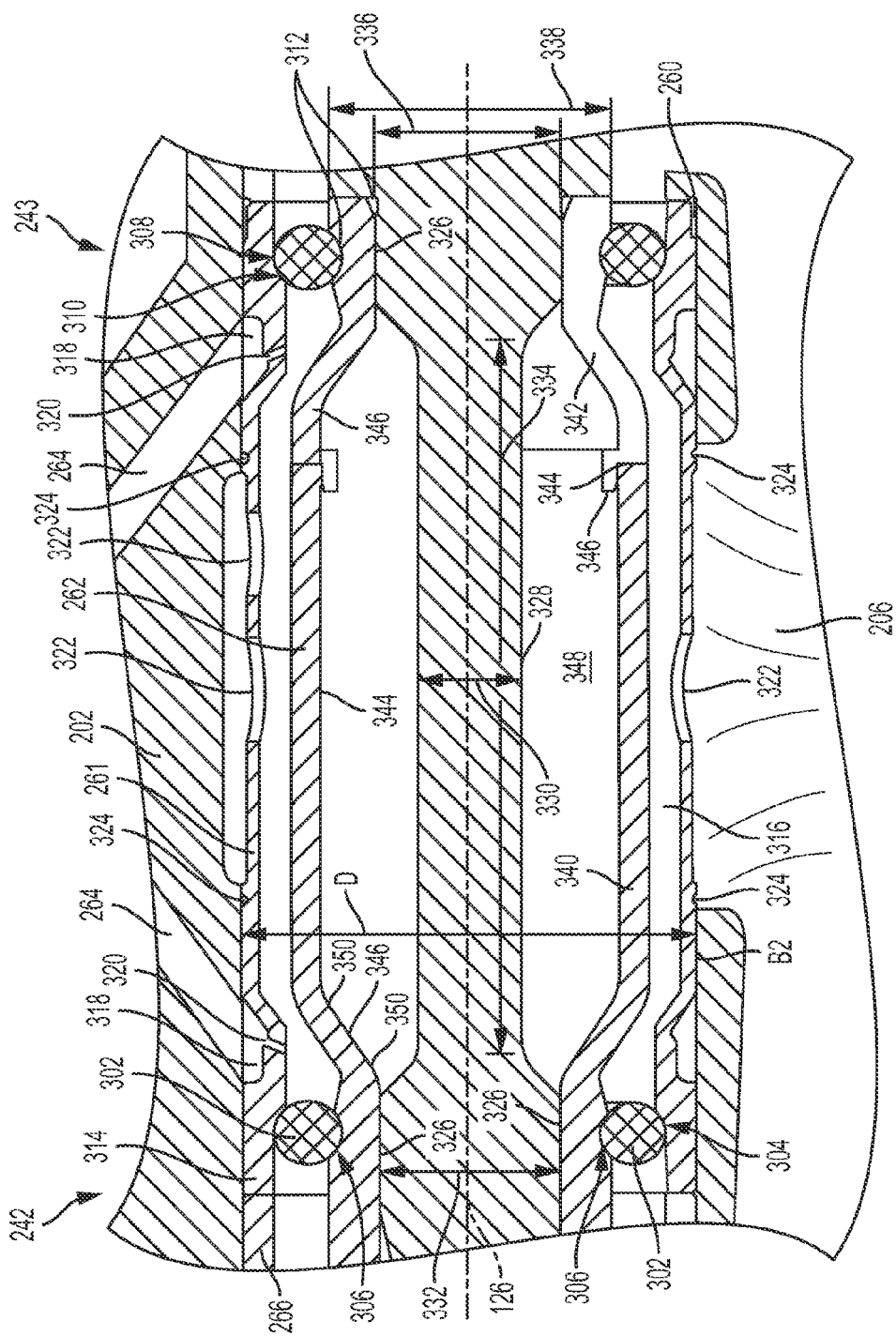
FIG. 4 is an enlarged detail view of the turbocharger bearings shown in FIG. 3.

An enlarged detailed view of the bearings 242 and 243 is shown in FIG. 4. In this illustration, and in the other illustrations that follow, structures that are the same or similar to structures previously described herein will be denoted by the same reference numerals previously used for simplicity. Accordingly, the first bearing 242, which can also be referred to as the compressor-side bearing, is formed by a plurality of roller elements 302 that are confined in rolling or sliding motion between an outer race groove 304, which is formed in the outer race 261, and an inner race groove 306, which is formed close to the outboard or compressor-side end of the inner race 262. Similarly, the second bearing 243, which can also be referred to as the turbine-side bearing, is formed by a plurality of roller elements 308 that are confined in rolling or sliding motion between a corresponding outer race groove 310 and inner race groove 312.

The outer race 261 forms various features that facilitate operation of the turbocharger 119 and also promote a desirable flow of lubrication oil through the bearing housing 202. More specifically, the outer race 261 has a generally hollow cylindrical shape that forms an outer wall or outer casing 314. The outer casing 314 forms the outer race grooves 304 and 310 at its ends, and encloses a cylindrical space 316 that surrounds the shaft 126 and inner race 262 during operation. Close to either end, the outer casing 314 forms two oil collection grooves or oil feed galleries 318, each of which is axially aligned with the passages 264 formed in the bearing housing 202 such that, during operation, oil flowing through the passages 264 collects and fills each of the two oil collection grooves or oil feed galleries 318. Lubrication passages 320 extend through the outer casing 314 and fluidly connect each respective oil feed gallery 318 with the cylindrical space 316 in an area close to the inner race grooves 306 and 312, and also the outer race grooves 304 and 310, to lubricate and cool the bearings 242 and 243 during operation. The outer casing 314 further forms drainage openings 322 that fluidly connect the cylindrical space 316 with the lubrication cavity 206 to drain out any oil collecting within the outer race 261.

The outer race 261 surrounds the inner race 262, which in turn surrounds a portion of the shaft 126. The inner race 262 forms two end portions 326 having a reduced diameter portion that engages the ends of the shaft 126. The shaft 126 includes a slender portion 328 having a reduced outer diameter 330, which is smaller than an increased outer diameter 332 at the ends of shaft 126. The slender portion 328 extends over an axial length 334. The increased outer diameter 332 of the shaft 126 mates at its ends with a reduced inner diameter 336 of the two end portions 326 of the inner race 262.

To provide torsional and bending rigidity to the shaft 126, the inner race 262 is advantageously flared along a middle portion thereof to form an increased inner diameter 338. The increased inner diameter 338 overlaps in an axial direction with the slender portion 328 to increase the bending stiffness of the combined structure of the shaft 126 and inner race 262 without considerably increasing the overall mass of the system. In the illustrated embodiment, to facilitate assembly, the inner race 262 is formed by two components, an outboard cup 340 and an inboard cup 342. One of the cups, in this case the inboard cup 342, forms a ledge and a wall that accepts therein the free, annular face of the outboard cup 340. Together, the outboard cup 340 and inboard cup 342 form the inner race 262 that has a central, flared portion 344 and two transition portions 346 connecting the flared portion 344 with the two end portions 326. Smooth or chamfered transitions 350, which avoid stress concentration, are provided between the end portions, the transition portions 346, and the flared portion 344. In the illustrated embodiment, each chamfered transition 350, which can be convex or concave, is formed at the same radius, but different radii can be used.

Figure 5:
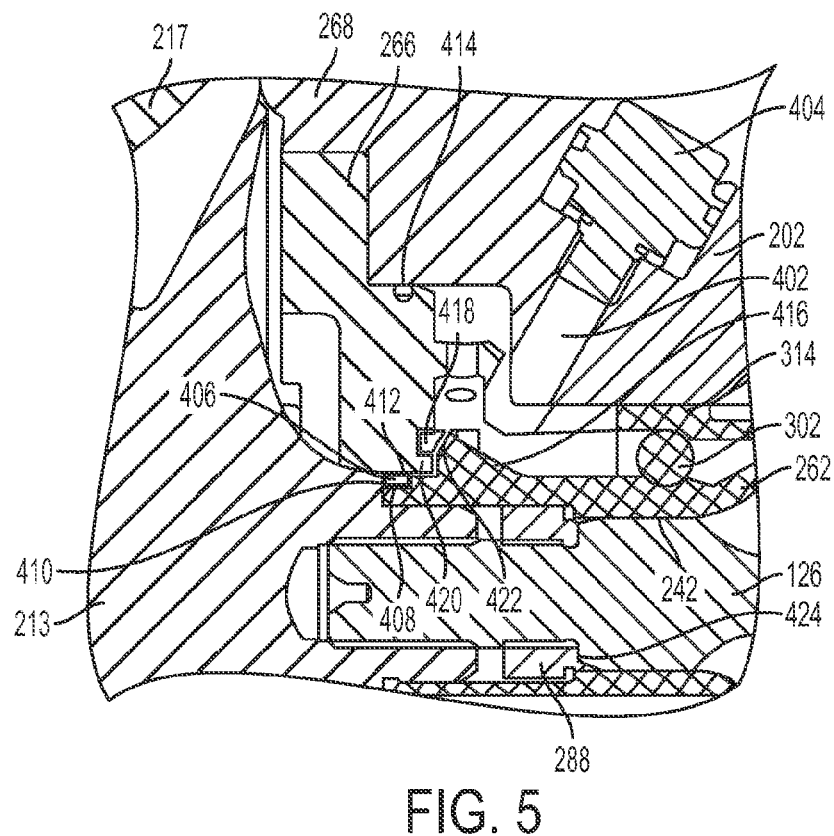
FIG. 5 is an enlarged detailed view of the oil containment arrangement at the compressor end of the shaft of the turbocharger shown in FIG. 3.

An enlarged detail view of an interface between the compressor wheel 213 and the shaft 126 is shown in FIG. 5. In this figure, a diagnostic passage 402 formed in the bearing housing 202 can be seen. The diagnostic passage 402 is plugged with a plug 404, which can be removed during service provide access, for example, to the interior of the bearing housing for installation of instrumentation and/or access to the interior of the bearing housing.

As can also be seen in FIG. 5, a ring seal 406 is disposed to provide a sliding seal between an internal, working chamber of the compressor and the oil cavity of the bearing housing. More specifically, the ring seal 406 is disposed in an open channel 408 that, together with an annular surface 410 on the inner side of the back of the compressor wheel 213, forms a U-shape. The open channel 408 is formed at the end of an extension of the inner race 262 that is disposed on an outboard side of the bearing 242. The ring seal 406 slidably and sealably engages an inner bore 412 of the bearing retainer 266 such that a sliding seal is provided between the inner race 262 and the bearing retainer 266 that provides sealing against leakage of oil from the bearing housing 202 into the compressor housing 217. In addition, it provides sealing against pressurized gas from entering the interior of the bearing housing. A bearing retainer seal 414 is disposed between an outer portion of the bearing retainer 266 and the compressor mounting plate 268. It is noted that an interior 348 (FIG. 4) of the inner race 262 is expected to be generally free of oil as no entry openings for oil are provided except, perhaps, the interface between the outboard cup 340 and the inboard cup 342. In the event of turbocharger failure, in a condition when the shaft 126 may be pulled towards the turbine housing, the retention nut 288 may be pulled towards and sealably engage a seat 424, to keep the piston rings engaged and retain the turbine wheel and shaft assembly within the bearing housing.

In the illustrated embodiment, a tortuous path is also provided to discourage oil flow towards the ring seal 406. As shown in FIG. 5, the end of the inner race 262 forms an oil slinger 416 that comprises a radially outward extending portion that slopes away from the shaft 126. The oil slinger 416 may be integrally formed with the inner race 262. Making the oil slinger 416 integral with the inner race 262 can improve the balance of the shaft 126 during operation of the turbocharger. The oil slinger 416 can operate to fling oil away from the area of the ring seal 406 via centrifugal force as the inner race 262 rotates during operation of the turbocharger. The oil that is flung off the oil slinger 416 may be provided from the center of the bearing housing. Additionally, the oil slinger 416 may include an outer tip portion 418 that is shaped as a cylindrical wall extending towards the compressor. The bearing retainer 266 forms an inwardly facing cylindrical wall 420 that is axially aligned with the outer tip portion 418 and disposed radially inward therefrom such that a meandering or tortuous path 422 is formed therebetween leading up to the ring seal 406.

Figure 7:
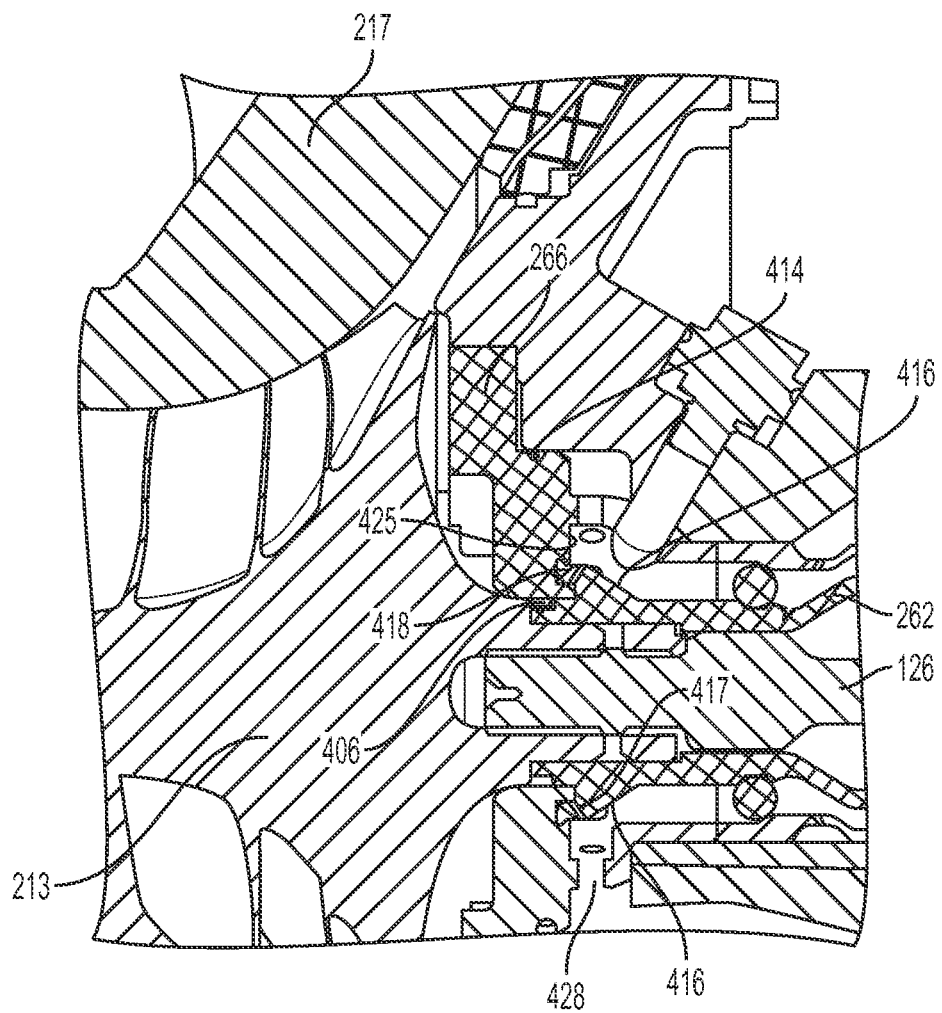
FIG. 7 is detailed view of the oil containment arrangement at the compressor end of the shaft of the turbocharger shown in FIG. 3.
Figure 8:
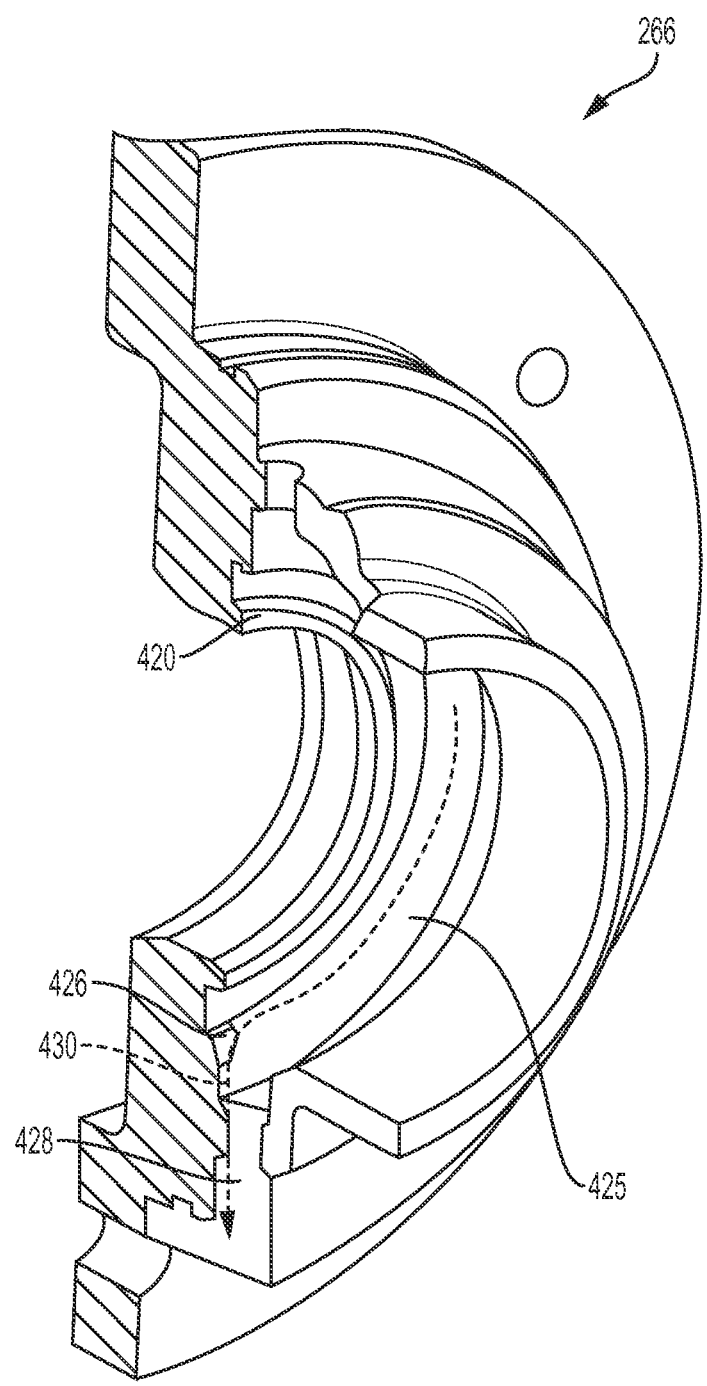
FIG. 8 is a fragmented perspective view of bearing retainer of the turbocharger shown in FIG. 3.

During shut-down of the turbocharger, despite the slowing rotation of the inner race 262, the oil slinger 416 will continue to fling oil outward and away from the ring seal 406 via centrifugal force. The oil can then drip downward via gravity including along the surface 425 (shown in FIGS. 7 and 8) of the bearing retainer 266 that is arranged radially outward of the cylindrical wall 420 and outer tip portion 418. A drip lip 426 may be formed in the bearing retainer 418 adjacent an outlet passage 428 in the bearing retainer 266 in order to direct the oil flowing downward off the bearing retainer into the outlet passage 428 (see FIG. 8). The drip lip 426 can be seen in the fragmented view of the bearing retainer 266 of FIG. 8 in which the flow of oil down the bearing retainer 266 is depicted by the arrow 430. The outlet passage 428 (shown in both FIGS. 7 and 8) may communicate with the lubrication cavity 206 such that the oil dripping off the bearing retainer 266 after shutdown of the turbocharger is collected in the lubrication cavity 206 from which it can exit via outlet 205 (see FIG. 3) to, for example, the engine. Any oil that may be present between the ring seal 406 and the outer tip portion 418 is allowed to drain out and through the outlet passage 428 via drain holes 417, which are formed in the oil slinger 416 and extend in a radially outward direction. It is noted that, during operation, ingress of oil in a radially inward direction through the drain holes 417 is avoided due to the centrifugal force acting on any oil present on the oil slinger 416.

Figure 6:
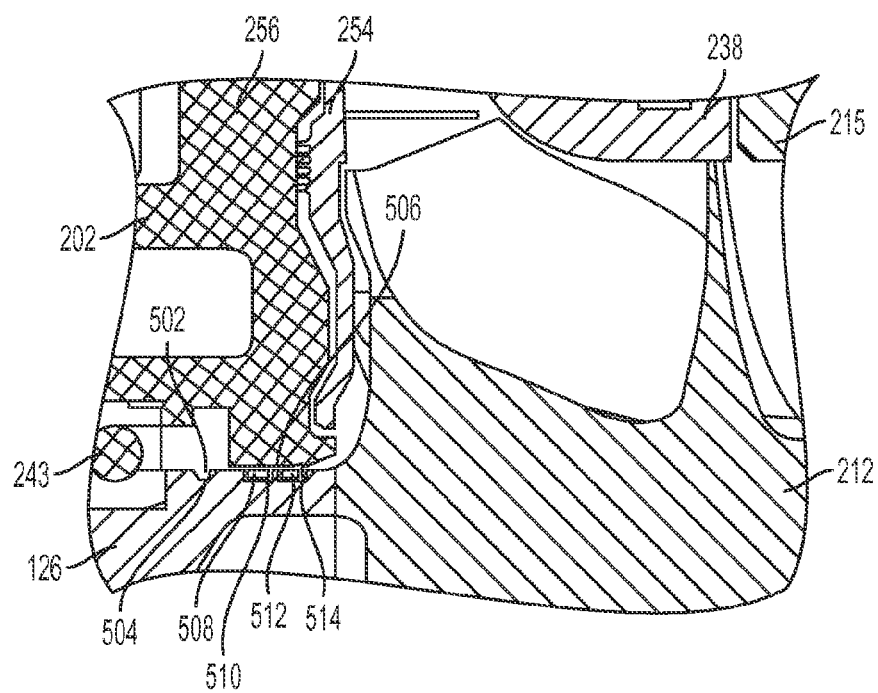
FIG. 6 is an enlarged detailed view of the oil containment arrangement at the turbine end of the shaft of the turbocharger shown in FIG. 3.

An enlarged detail view of an interface between the turbine wheel 212 and the bearing housing 202 is shown in FIG. 6. In this figure, a drainage groove 502 is formed towards an end 504 of the shaft 126 to facilitate drainage of oil passing through the innermost bearing surface B4 into the scavenge oil gallery. To seal against leakage of oil and to provide sealing against pressurized gas from entering the interior of the bearing housing 202, two ring seals are provided between the shaft 126 and an inner bore 506 of the turbine flange 256. More specifically, a first ring seal 508 is disposed in a channel 510 formed in the shaft 126, and a second ring seal 512 is disposed in a channel 514, which is also formed in the shaft 126.

During operation, oil from within the bearing housing 202 is discouraged from leakage into the working chamber of the turbine by the sliding and sealing contact of the first ring seal 508 and the second ring seal 512 with the shaft 126 and the inner bore 506 of the turbine flange 256. It is noted that, in the event of a failure in the turbocharger during which the shaft 126 may displace towards the turbine, at least the first ring seal 508 can axially displace within the inner bore 506 for a predetermined distance while still maintaining contact therewith to provide a seal even under a failure mode, to avoid leakage of oil into the turbine housing. The same sliding tolerance is provided in the event the shaft 126 displaces towards the compressor, in which case the second ring seal 512 can displace within the inner bore 506 while still maintaining its sealing function.

INDUSTRIAL APPLICABILITY

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:

1. A turbocharger, comprising:
a turbine that includes a turbine wheel;
a compressor that includes a compressor wheel;
a bearing housing disposed and connected between the turbine and the compressor, the bearing housing forming a bearing bore therethrough;
a shaft rotatably disposed within the bearing housing and extending into the turbine and the compressor, wherein the turbine wheel is connected to one end of the shaft and wherein the compressor wheel is connected to an opposite end of the shaft such that the turbine wheel is rotatably disposed in the turbine and the compressor wheel is rotatably disposed in the compressor;
a bearing arrangement disposed between the shaft and the bearing housing, the bearing arrangement including a roller bearing formed between an outer bearing race disposed in the bearing bore, and an inner bearing race disposed in the outer bearing race, wherein the inner bearing race is arranged to rotate with the shaft, and wherein an end portion of the bearing inner race includes an integral oil slinger comprising a radially outward extending portion that slopes away from the shaft; and
a bearing retainer connected between the bearing housing and the compressor, the bearing retainer forming an inner bore through which the shaft extends, and a ring seal disposed to sealably engage the inner bearing race and the inner bore of the bearing retainer, wherein a tortuous path is provided between an oil collection gallery of the bearing housing and the ring seal.

2. The turbocharger of claim 1 wherein the ring seal is arranged in a U-shaped channel defined by a shoulder of the compressor wheel and an open channel in the inner bearing race.

3. The turbocharger of claim 1 wherein the tortuous path is defined along an interface between the bearing retainer and the inner bearing race to discourage oil flow towards the ring seal.

4. The turbocharger of claim 3 wherein the bearing retainer forms an inwardly facing cylindrical wall around the inner bore, and wherein the tortuous path is defined between the oil slinger and the radially outward extending portion, which are axially aligned.

5. The turbocharger of claim 1 wherein the shaft is connected to the inner bearing race at end portions, the end portions having a first diameter, the shaft further forming a slender portion between the end portions, the slender portion having a second diameter that is less than the first diameter.

6. The turbocharger of claim 5 wherein the increased inner diameter of the inner bearing race overlaps in an axial direction with the slender portion of the shaft.

7. The turbocharger of claim 1 wherein the inner bearing race is formed by two components, an outboard cup and an inboard cup.

8. The turbocharger of claim 1 wherein the bearing retainer includes an outlet passage communicating with a lubrication cavity and a drip lip adjacent the outlet passage.

9. An internal combustion engine having a plurality of combustion chambers formed in a cylinder block, an intake manifold disposed to provide air or a mixture of air with exhaust gas to the combustion chambers, and an exhaust manifold disposed to receive exhaust gas from the combustion chambers, the engine further comprising:
a turbine that includes a turbine housing surrounding a turbine wheel, the turbine housing being fluidly connected to the exhaust manifold and disposed to receive exhaust gas therefrom to drive the turbine wheel;
a compressor that includes a compressor housing that surrounds a compressor wheel, the compressor housing being fluidly connected to the intake manifold and disposed to provide air thereto;
a bearing housing disposed and connected between the turbine and the compressor, the bearing housing forming a bearing bore therethrough;
a shaft rotatably disposed within the bearing housing and extending into the turbine and the compressor, wherein the turbine wheel is connected to one end of the shaft and wherein the compressor wheel is connected to an opposite end of the shaft such that the turbine wheel is rotatably disposed in the turbine and the compressor wheel is rotatably disposed in the compressor;
a bearing arrangement disposed between the shaft and the bearing housing, the bearing arrangement including a roller bearing formed between an outer bearing race disposed in the bearing bore, and an inner bearing race disposed in the outer bearing race, wherein the inner bearing race is arranged to rotate with the shaft, and wherein an end portion of the inner bearing race includes an integral oil slinger comprising a radially outward extending portion that slopes away from the shaft; and
a bearing retainer connected between the bearing housing and the compressor, the bearing retainer forming an inner bore through which the shaft extends, and the ring seal disposed to sealably engage the inner bearing race and the inner bore of the bearing retainer, wherein a tortuous path is provided between an oil collection gallery of the bearing housing and the ring seal.

10. A turbocharger, comprising:
a turbine that includes a turbine housing surrounding a turbine wheel;
a compressor that includes a compressor housing that surrounds a compressor wheel;
a bearing housing disposed and connected between the turbine and the compressor, the bearing housing forming a bearing bore therethrough that accommodates a shaft interconnecting the turbine wheel and the compressor wheel to transfer power therebetween;
wherein the shaft is rotatably mounted within the bearing housing and extends into the turbine and the compressor such that the turbine wheel is connected to one end of the shaft and the compressor wheel is connected to an opposite end of the shaft;
a bearing arrangement disposed between the shaft and the bearing housing, the bearing arrangement including first and second bearings, each of the first and second bearings formed by a respective first and second plurality of rollers engaged between a respective first and second inner race and a respective first and second outer race;

an outer bearing race disposed within the bearing bore and forming the respective first and second outer races;

an inner bearing race disposed within the outer bearing race and between the outer bearing race and the shaft, the inner bearing race forming the respective first and second inner races such that the respective first inner race is axially aligned with the respective first outer race, and the respective second inner race is axially aligned with the respective second outer race, wherein the inner bearing race is arranged to rotate with the shaft, and wherein an end portion of the bearing inner race includes an integral oil slinger comprising a radially outward extending portion that slopes away from the shaft; and a bearing retainer connected between the bearing housing and the compressor, the bearing retainer forming an inner bore through which the shaft extends, and a ring seal disposed to sealably engage the inner bearing race and the inner bore of the bearing retainer, wherein a tortuous path is provided between an oil collection gallery of the bearing housing and the ring seal.

11. The turbocharger of claim 10 wherein the ring seal is arranged in a U-shaped channel defined by a shoulder of the compressor wheel and an open channel in the inner bearing race.

12. The turbocharger of claim 10 wherein the tortuous path is defined along an interface between the bearing retainer and the inner bearing race to discourage oil flow towards the ring seal.

13. The turbocharger of claim 12 wherein the bearing retainer forms an inwardly facing cylindrical wall around the inner bore, and wherein the tortuous path is defined between the oil slinger and the radially outward extending portion, which are axially aligned.

14. The turbocharger of claim 10 wherein the bearing retainer includes an outlet passage communicating with a lubrication cavity and a drip lip adjacent the outlet passage.

* * * * *